June 14, 1927.

W. H. FULWEILER ET AL

PROCESS OF PURIFYING GAS

Filed June 24, 1926   2 Sheets-Sheet 1

1,632,758

WITNESS:
Rob H Kitchel

INVENTORS
Claude W. Jordan and
Walter H. Fulweiler
BY
Augustus B. Stoughton
ATTORNEY Patented June 14, 1927.

1,632,758

UNITED STATES PATENT OFFICE.

WALTER H. FULWEILER, OF WALLINGFORD, AND CLAUDE W. JORDAN, OF NORWOOD, PENNSYLVANIA, ASSIGNORS TO THE U. G. I. CONTRACTING COMPANY, OF PHILADELPHIA, PENNSYLVANIA, A CORPORATION OF DELAWARE.

PROCESS OF PURIFYING GAS.

Application filed June 24, 1926. Serial No. 118,384.

Impurities, more particularly hydrogen sulphide, are removed from illuminating and other gas by scrubbing it with a solution of sodium carbonate or salt that is sufficiently alkaline for the purpose. The solution thus fouled is fitted for reuse or revivified by passing subdivided air through the solution.

The present invention relates to that step in the process which consists in revivifying the foul solution of alkali sulphydrate by passing air through it and more particularly to improvements in that step.

Objects of the invention are to provide a dual air control; to avoid oxidizing the sodium sulphydrate to thiosulphate; to control the foaming off of sulphur; and to improve the revivification of the foul solution.

To these and other ends hereinafter set forth the invention, generally stated, may be said to comprise the step in revivifying the foul solution of an alkali sulphydrate which consists in stirring the solution with a rapidly moving immersed paddle, passing finely divided air through the solution by introducing air under the paddle, and selectively controlling the subdivision of the air by the speed of the paddle and the depth of its immersion and the quantity of air.

The invention also comprises the improvements to be presently described and finally claimed.

The invention may be practiced by means of the apparatus illustrated in the accompanying drawing forming part hereof and in which—

Figure 1:
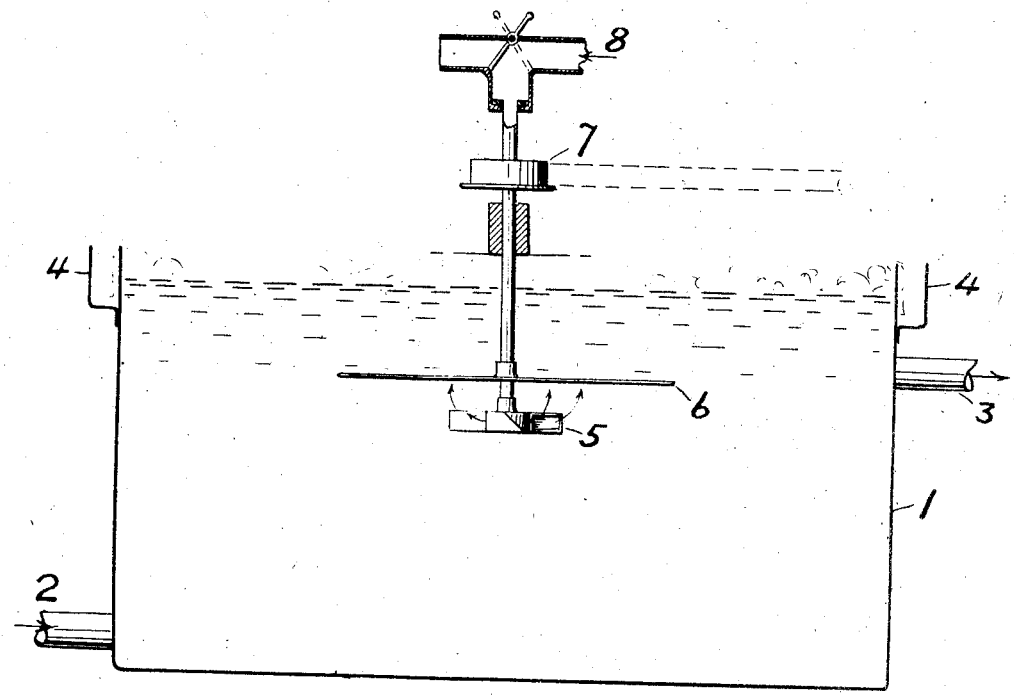
Figure 1 is a diagrammatic view principally in section illustrating a spumer arranged in a tank.
Figure 2:
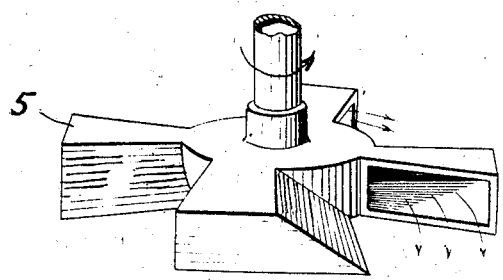
Fig. 2 is a perspective view of the spumer.

In the apparatus shown in Figs. 1 and 2, 1 is a tank or receptacle having an inlet connection 2 and an outlet connection 3 and a foam receiving trough 4. 5 is a spumer shown as arranged beneath a baffle plate 6, and together these elements constitute a paddle. The spumer is rotated by means indicated at 7 at a speed that may be varied. Air in regulated quantity is blown into and through the spumer by means indicated at 8.

The practice of the process of the invention in connection with the apparatus shown in the drawing may be described as follows:

The foul solution, consisting of sodium sulphydrate and resulting from scrubbing gas with a solution of sodium carbonate containing a catalyst of which a relatively small quantity of soluble iron salt in a form not precipitatable by hydrogen sulphide is an example passes by 2 into the tank or receptacle 1 where it has passed through it from under the immersed paddle relatively finely divided air which decomposes the sodium sulphydrate setting free sulphur as such and re-forming the original salt solution, and also relatively coarsely divided air which foams off the sulphur as it is set free. The foam carrying sulphur collects or is collected in the trough 4, and the original salt or revivified solution is led off by 3 for reuse for scrubbing gas. By changing the speed of rotation of the spumer or paddle, the quantity of finely divided air is increased or diminished, and by blowing more or less air into the spumer the quantity of coarsely divided air is varied so that there is a dual air control and there is also an efficient and comparatively simple application of the air in finely divided condition. The depth of immersion of the paddle is also a factor in the air control.

Figure 3:
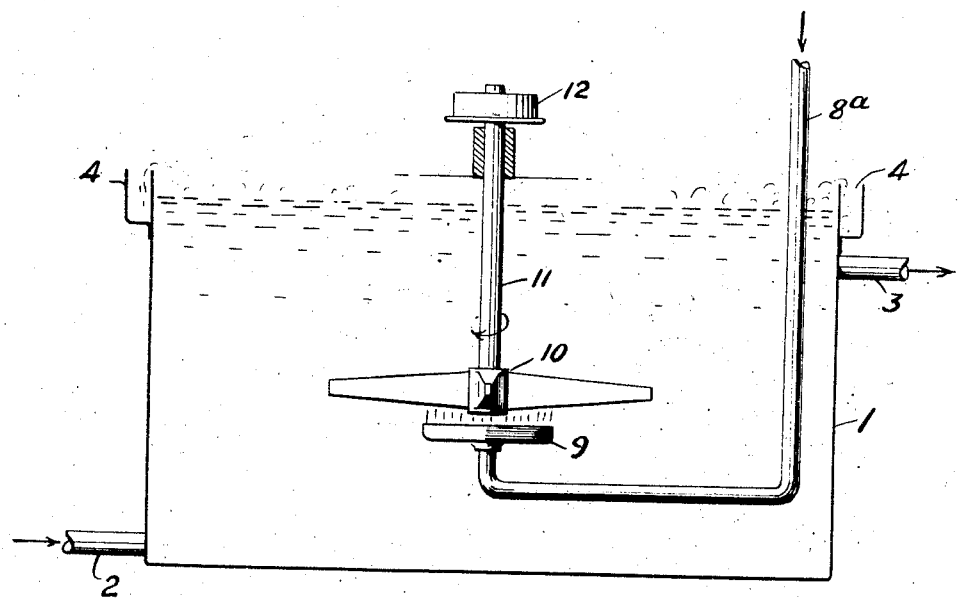
Fig. 3 is a diagrammatic view principally in section illustrating a modification of the apparatus shown in Figs. 1 and 2.

The practice of the process in connection with the apparatus illustrated in Fig. 3 is as has been above described in connection with Figs. 1 and 2, however, in Fig. 3 the coarsely and finely divided air supply is introduced by means of a fixed rose or perforated nozzle 9 connected with a fixed regulatable air supply 8ª, and by means of a paddle 10, arranged above the rose or nozzle 9 and rotated by means of a shaft 11 and pulley 12.

In the foregoing description reference to sodium carbonate is intended to include solutions of a salt that are sufficiently alkaline to absorb hydrogen sulphide from gas.

It will be obvious to those skilled in the art to which the invention relates that modifications may be made in details of procedure and in matters of mere form without departing from the spirit of the invention which is not limited to such matters or otherwise than the prior art and the appended claims may require.

We claim:

1. In the process of purifying gas the improvement in revivifying the foul solution of alkali sulphydrate which consists in stirring the solution with a rapidly moving immersed paddle, passing finely divided air through the solution by introducing air under the paddle, and selectively controlling the sub-division of the air by the speed of the paddle and the depth of its immersion and the supply of air.

2. In the process of purifying gas the improvement in revivifying the foul solution of alkali sulphydrate which consists in stirring the solution with a rapidly moving immersed paddle, and passing selectively subdivided air through the solution by introducing air under the paddle.

CLAUDE W. JORDAN.
WALTER H. FULWEILER.